(No Model.)
L. HALL, Jr.
CAR AXLE.
No. 450,230. Patented Apr. 14, 1891.
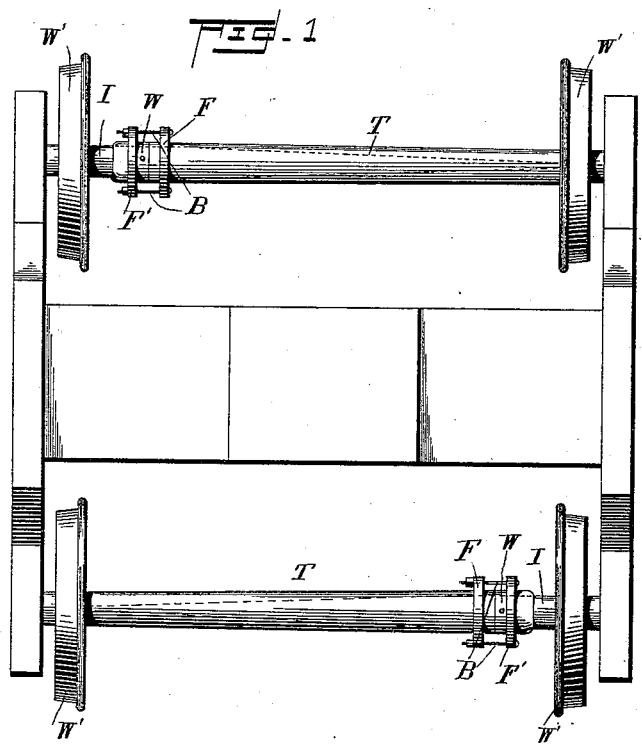
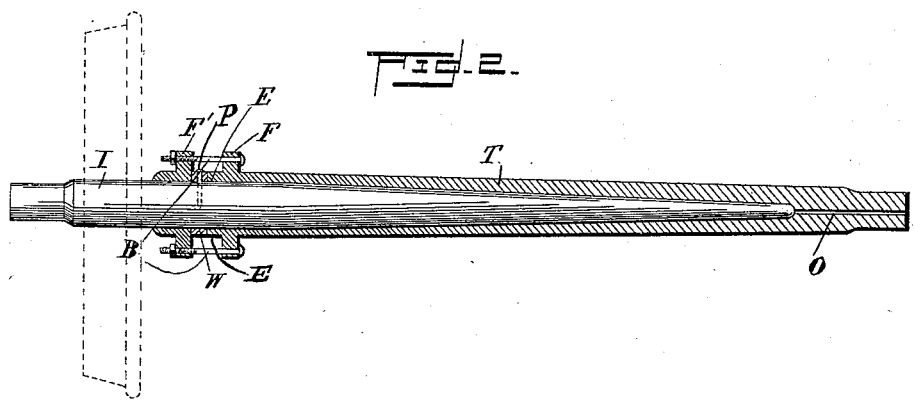
Witnesses
E. S. Duvall Jr.
N. L. Collamer
Inventor
Langley Hall, Jr.
By his Attorneys,
C. A. Snow & Co.

United States Patent Office.

LANGLEY HALL, JR., OF GLENDALE, ASSIGNOR OF ONE-FOURTH TO GALLATIN A. TAYLOR, OF ROSEBURG, OREGON.

CAR-AXLE.

SPECIFICATION forming part of Letters Patent No. 450,230, dated April 14, 1891.

Application filed August 25, 1890. Serial No. 362,928. (No model.)

*To all whom it may concern:*

Be it known that I, LANGLEY HALL, Jr., a citizen of the United States, residing at Glendale, in the county of Douglas and State of Oregon, have invented a new and useful Railway-Car Axle, of which the following is a specification.

This invention relates to railway-cars, and more especially to the axles thereof, and the object of the same is to effect improvements upon axles of this character in which one extremity is free to revolve independently of the other, as in rounding curves.

To this end the invention consists of the specific details of construction hereinafter more fully described and claimed.

In the drawings, Figure 1 is a plan view showing a diagram of a car-truck in which two of these axles are employed. Fig. 2 is a central longitudinal section of one of my improved axles.

Referring to the said drawings, W' W' are the wheels, one of which is fast upon the interior member I of the axle and the other of which is fast upon the tubular member T thereof. Said tubular member surrounds the interior member, as shown in Fig. 2, and is provided with a collar or flange F near its open end. A similar collar or flange F' is mounted loosely upon the interior member I at a short distance from said open end, and the two flanges are connected, as by bolts B.

Between the outer collar F' and the open end E is a washer W, removably fixed upon the interior member I by pins or screws P, passing through the washer W into the member I. This washer turns between said outer collar and open end and below and out of contact with the bolts B. By this means a longitudinal displacement of the two members of the axle is prevented, and yet their independent revolution is permitted. The wheels W' are secured upon the axle members near their outer ends, and the latter are mounted in journal-boxes in the car-truck in any preferred manner. The interior member I is preferably lubricated through an opening O, formed in the end of the tubular member, as seen in Fig. 2, the oil being led by such opening entirely through the wheel which is mounted upon the tubular member. Flowing the length of the tubular member the oil reaches the end E and thoroughly lubricates the washer W; but as there is nothing surrounding said washer except the bolts all dirt in the oil or particles of ground metal can readily fall to the ground and an excess of oil will drip out. In this manner the excessive wear or clogging of parts is avoided.

In axles of this character heretofore constructed the washer W was an integral part of the inner member. Much difficulty has been found in making the members so provided with the washer or collar, and in the use of the same, as soon as such collar became worn by the excessive friction on both its sides the entire member had to be replaced. In the present case a new washer W only is substituted. Furthermore, if it is desired to adjust the members longitudinally with respect to each other (as to take up wear or change the gage of the wheels) it can be done if the washer is movable; but it would be impossible with an integral collar.

What I claim is—

The herein-described car-axle, the same comprising a tubular member T, having an exterior flange F near its inner end E, an inner member I, turning within said tubular member, a washer W, a pin P, removably securing it to said inner member and at one side against said inner end E, a flange F', mounted loosely on said inner member and bearing against the other side of said washer, said flanges projecting radially farther than the washer, and bolts B, connecting said flanges across the space around the washer, substantially as described.

In testimony that I claim the foregoing as my own I have hereto affixed my signature in presence of two witnesses.

LANGLEY HALL, JR.

Witnesses:
C. F. SCHERMERHORN,
H. W. CHURCHILL.